United States Patent
Bormann et al.

(10) Patent No.: US 8,388,864 B2
(45) Date of Patent: Mar. 5, 2013

(54) PROCESS AND PLANT FOR PRODUCING SYNTHESIS GAS

(75) Inventors: Andreas Bormann, Frankfurt am Main (DE); Dierk Müller, Karben (DE)

(73) Assignee: Lurgi GmbH, Frankfurt am Main (DE)

( * ) Notice: Subject to any disclaimer, the term of this patent is extended or adjusted under 35 U.S.C. 154(b) by 195 days.

(21) Appl. No.: 12/300,683

(22) PCT Filed: May 10, 2007

(86) PCT No.: PCT/EP2007/004152
§ 371 (c)(1), (2), (4) Date: Nov. 13, 2008

(87) PCT Pub. No.: WO2007/134727
PCT Pub. Date: Nov. 29, 2007

(65) Prior Publication Data
US 2009/0105356 A1    Apr. 23, 2009

(30) Foreign Application Priority Data
May 18, 2006   (DE) .......................... 10 2006 023 248

(51) Int. Cl.
C01B 3/24    (2006.01)
C01B 3/38    (2006.01)

(52) U.S. Cl. ........................................ 252/373; 423/650

(58) Field of Classification Search ................... 423/650
See application file for complete search history.

(56) References Cited

U.S. PATENT DOCUMENTS
4,782,096 A    11/1988    Banquy
(Continued)

FOREIGN PATENT DOCUMENTS
EP    0483795    5/1992
EP    0516441    12/1992
(Continued)

OTHER PUBLICATIONS

Göhna, Hermann, "Concepts for Modern Methanol Plants," *1997 World Methanol Conference*, Tampa, Florida, USA Dec. 8-10, 1997, 139-142.
(Continued)

*Primary Examiner* — Melvin C Mayes
*Assistant Examiner* — Kenneth Vaden
(74) *Attorney, Agent, or Firm* — Pauly, Devries Smith & Deffner, L.L.C.

(57) ABSTRACT

When producing synthesis gas from a starting material containing hydrocarbons, in particular natural gas, a feed stream of the starting material is divided into a first partial stream and a second partial stream. The first partial stream is supplied to a steam reformer (4), in which together with steam it is catalytically converted to a gas stream containing carbon oxides. Then, the first partial stream is again combined with the second partial stream and the combined gas stream is supplied to an autothermal reformer (7), in which together with gas rich in oxygen it is autothermally reformed to a synthesis gas in the presence of a cracking catalyst. Processing a starting material with a high content of higher hydrocarbons is made possible in that before the steam reformer (4) and before the autothermal reformer (7) the entire starting material is supplied to a pre-reformer (2) in which the starting material largely is liberated from higher hydrocarbons.

8 Claims, 1 Drawing Sheet

U.S. PATENT DOCUMENTS

| | | | |
|---|---|---|---|
| 5,252,609 A | 10/1993 | Pinto | |
| 5,449,696 A * | 9/1995 | Dandekar et al. | 518/706 |
| 6,375,916 B2 | 4/2002 | Christensen et al. | |
| 2004/0063798 A1 | 4/2004 | Erikstrup et al. | |
| 2004/0156778 A1 * | 8/2004 | Hwang et al. | 423/651 |

FOREIGN PATENT DOCUMENTS

| | | |
|---|---|---|
| EP | 0578218 | 1/1994 |
| EP | 0989094 | 3/2000 |
| EP | 1570901 | 9/2005 |
| EP | 1586535 | 10/2005 |
| GB | 2160516 | 12/1985 |
| GB | 2407819 | 5/2005 |
| WO | WO-00/05168 | 2/2000 |
| WO | WO-01/42175 | 6/2001 |
| WO | WO-02/26677 | 4/2002 |
| WO | WO-02/36532 | 5/2002 |
| WO | WO-02/100773 | 12/2002 |
| WO | WO-2004/041716 | 5/2004 |
| WO | 2004096952 | 11/2004 |
| WO | WO-2005/000736 | 1/2005 |

OTHER PUBLICATIONS

Dybkjaer, IB, "Large-Scale Production of Alternative Synthetic Fuels from Natural Gas," Surface Science and Catalysis, vol. 107, 1997, 18 pages.

* cited by examiner

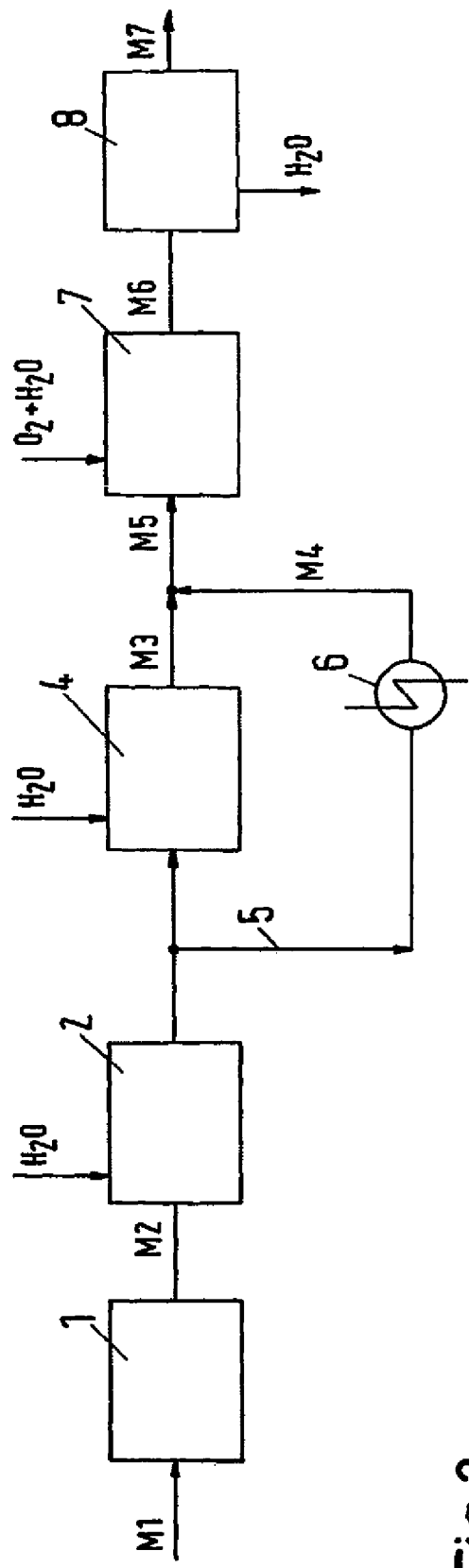
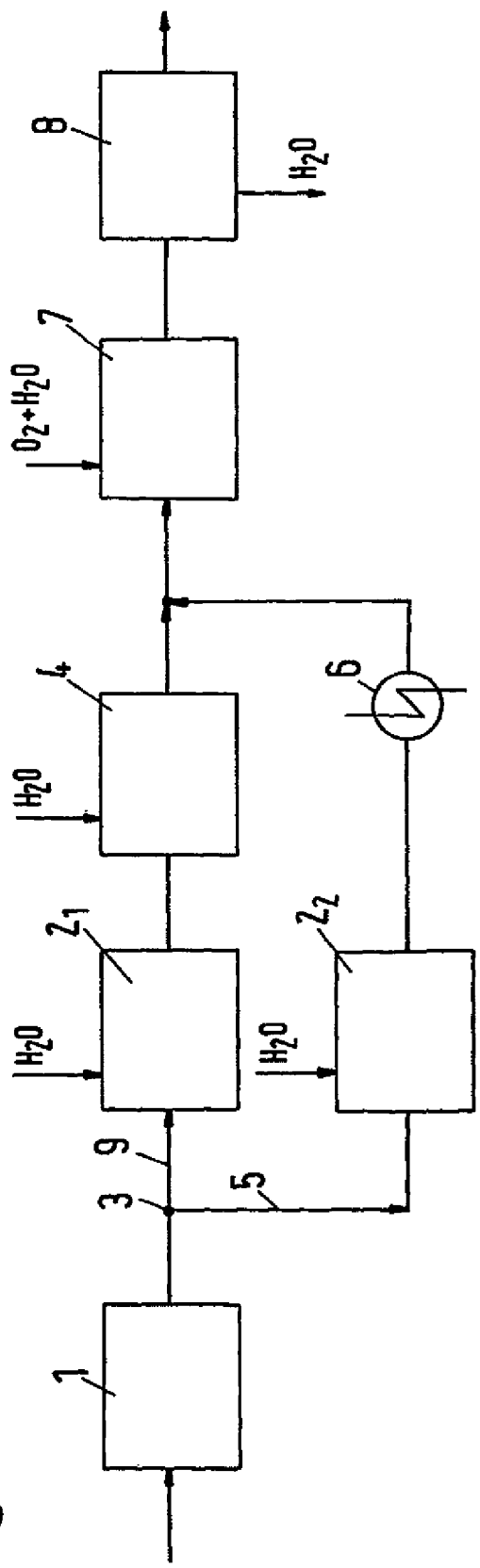

PROCESS AND PLANT FOR PRODUCING SYNTHESIS GAS

TECHNICAL FIELD

The present invention relates to a process and a plant for producing synthesis gas from a starting material containing hydrocarbons, in particular natural gas, wherein a feed stream of the starting material is divided into a first partial stream and a second partial stream, wherein the first partial stream is supplied to a steam reformer, in which together with steam it is catalytically converted to a gas stream containing hydrogen and carbon oxides, wherein upon steam reforming the first partial stream is again combined with the second partial stream, and wherein the combined gas stream is supplied to an autothermal reformer, in which it is autothermally reformed to a synthesis gas together with gas rich in oxygen.

As starting product for obtaining synthesis gas as it is subsequently used for the production of chemical products, e.g. methanol or ammonia, natural gas is used in particular. Natural gas substantially is a mixture of gaseous hydrocarbons, whose composition varies depending on the place of origin. The main component of natural gas is methane. In addition, it includes higher hydrocarbons with two or more hydrocarbon atoms and by-products such as sulfur.

The conversion of natural gas into synthesis gas has long since been effected in steam reformers by catalytic conversion of the hydrocarbons with steam on the basis of the following endothermal reactions:

$$C_nH_{2n+2} + 2nH_2O \Leftrightarrow nCO_2 + n4H_2 \text{ and}$$

$$C_nH_{2n+2} + nH_2O \Leftrightarrow nCO + n3H_2$$

For reducing the emission of pollutants and for saving energy, autothermal catalytic reformers are used in addition, which are provided downstream of the steam reformer. Such combined processes are referred to as "Combined Reforming". In autothermal reforming, the required energy is supplied by combustion with oxygen according to the following reaction:

$$CH_4 + O_2 \Leftrightarrow CO + H_2 + H_2O$$

Carbon monoxide and hydrogen substantially are obtained from the hydrocarbons.

One development of the Combined Reforming is described in EP 0 233 076 B1. Here, the natural gas supplied is divided into two streams. One partial stream is passed through the steam reformer, in which the natural gas together with steam is catalytically converted to a gas stream containing hydrogen and carbon oxides and is then supplied to the downstream autothermal reformer. The second partial stream is supplied directly to the autothermal reformer past the steam reformer. In the autothermal reformer, the gas stream supplied together with oxygen is reformed to synthesis gas, which subsequently is used for methanol synthesis. When the gas stream supplied to the steam reformer contains higher hydrocarbons, additional steam must be supplied to achieve a steam/carbon ratio acceptable for the reforming reaction. The plant is enlarged and the equipment and operating costs are increased thereby.

Therefore, it has already been proposed to provide a pre-reformer before the steam reformer, in which the higher hydrocarbons are converted into $C_1$ components (cf. Hermann Göhna: "Concepts for modern methanol plants", presented and published on the 1997 World Methanol Conference in Tampa, Fla., USA, Dec. 8 to 10, 1997, pages 139 to 142). By converting the higher hydrocarbons into methane, it is possible to provide a lower steam/carbon ratio in the succeeding steam reformer. This leads to lower throughput volumes and hence reduced investment costs. On the other hand, a higher conversion of the feed gas can be achieved by the higher temperatures in the steam reformer. Here as well, the second partial stream is supplied directly to the autothermal reformer.

For an economic operation of the autothermal reformer it is required to preheat the feed gas to a temperature as high as possible. As a result, the demand of oxygen, which is required for the autothermal cracking reaction and is very expensive, can be reduced. The preheating temperature of the feed gas, however, is limited by higher hydrocarbons contained therein, which at higher temperatures lead to soot formation by cracking reactions. This can lead to problems in particular with feed gas, in which the content of heavy components is relatively high.

DESCRIPTION OF THE INVENTION

It is the object of the invention to improve the economy in the production of synthesis gas also when processing natural gas with a high content of higher hydrocarbons.

By initially passing the entire starting material supplied to the steam reformer and the autothermal reformer through a pre-reformer in accordance with the invention, the amount of higher hydrocarbons, i.e. hydrocarbons with two or more hydrocarbon atoms, can largely be reduced or be eliminated completely.

In accordance with a preferred aspect of the invention, pre-reforming is effected in the main stream of the starting material before division into the first and second partial streams. As compared to the pre-reformer previously provided in the partial stream to the steam reformer, the pre-reformer merely must be enlarged in adaptation to the quantity of the second partial stream which now must be handled in addition. The additionally required investment costs can be minimized thereby.

In another aspect of the invention, the first and second partial streams of the starting material are separately subjected to pre-reforming. This aspect is particularly expedient for retrofitting existing plants, in which a pre-reformer already is provided before the steam reformer.

In the pre-reformer, the starting material is subjected to an adiabatic steam reforming reaction in accordance with the invention, so that higher hydrocarbons reliably are converted into $C_1$ components. Independent of the composition of the natural gas, a substantially uniform material is supplied to the steam and autothermal reformers.

The conversion reaction in the pre-reformer is effected particularly effectively, when the starting material is supplied to the pre-reformer with a temperature of 400 to 500° C., preferably 450 to 500° C., and in particular about 480° C.

The part of the starting material branched off in the second partial stream, which is supplied directly to the autothermal reformer past the steam reformer, is determined in adaptation to the quality of the starting material to be processed and in particular the subsequent processes. In accordance with the invention, a partial stream of 20 to 80% of the starting material can be branched off. When the synthesis gas obtained is supplied to a methanol plant, which in general requires a $H_2/CO$ ratio of 2:1, an amount of 20 to 30%, in particular about 25%, preferably is guided past the steam reformer.

In accordance with the invention, the gas stream is supplied to the autothermal reformer with a temperature of 650 to 850° C., preferably 700 to 800° C., and in particular about 760° C. Due to the high temperature, the supply of oxygen to the autothermal reformer can be minimized. This reduces the costs for the air separation plant.

In accordance with a development of this invention, a heat exchanger is provided in the bypass conduit leading directly to the autothermal reformer, in order to also heat the gas stream guided past the steam reformer to the desired inlet temperature of the autothermal reformer. This is possible, because the amount of higher hydrocarbons is reduced by pre-reforming, and soot formation by cracking therefore is excluded.

The process of the invention provides for the treatment of starting material with a high content of higher hydrocarbons, in particular with more than 12 vol-% of higher hydrocarbons. The plant can of course also be used with lower amounts of higher hydrocarbons, so that it is possible to flexibly react to changing natural gas qualities.

Developments, advantages and possible applications of the invention can also be taken from the following description of embodiments and the drawing. All features described and/or illustrated form the subject-matter of the invention per se or in any combination, independent of their inclusion in the claims or their back-reference.

BRIEF DESCRIPTION OF THE DRAWINGS

FIG. 1 schematically shows a flow diagram for the production of synthesis gas in accordance with a first embodiment of the invention, and FIG. 2 schematically shows a flow diagram for the production of synthesis gas in accordance with a second embodiment of the invention.

DETAILED DESCRIPTION OF THE PREFERRED EMBODIMENTS

In the flow diagram of a process for producing synthesis gas in accordance with the invention, which is schematically shown in FIG. 1, the starting material, in particular natural gas, initially is liberated from disturbing by-products, in particular sulfur, in a desulfurization plant 1. Subsequently, the natural gas, which for instance has a content of >12 vol-% of higher hydrocarbons, i.e. hydrocarbons with two or more hydrocarbon atoms, is mixed with water or steam and supplied to a pre-reformer 2. This is for instance an adiabatically operating steam reformer with a nickel- or copper-based catalyst, in which the hydrocarbons are converted into $C_1$ components by means of the steam reforming reaction at a low temperature of 450 to 500° C., in particular about 480° C. The temperature is chosen such that the reaction equilibrium very much lies on the side of methane. Higher hydrocarbons are decomposed to CO and $H_2$ and then chiefly react to form methane. There is obtained a gas rich in methane, which contains $H_2$ and $CO_2$. Experience has shown that the temperature of the gas stream in the pre-reformer is decreasing by about 10-50° C. depending on the feed gas.

Behind the pre-reformer 2, the feed stream is divided at a branching point 3 into a first partial stream, which is supplied to a steam reformer 4, and a second partial stream, which is guided past the steam reformer 4 via a bypass conduit 5.

To the steam reformer 4, e.g. a tubular reformer, steam is supplied beside the gas stream. In an endothermal reaction, the gas stream and the steam are converted into a gas mixture with hydrogen, carbon oxides and methane by contact with a catalyst. The heat required for steam reforming is supplied for instance by non-illustrated burners. At the outlet of the steam reformer 4, the temperature of the gas stream is 650 to 850° C., in particular about 760° C.

In the bypass conduit 5, a heat exchanger 6 is provided, by means of which the temperature of the partial stream guided past the steam reformer 4 is increased to 600 to 700° C., in particular about 650° C., before it is again combined with the outlet stream of the steam reformer 4. With a temperature of 650 to 850° C., in particular about 730° C., the combined gas stream is supplied to an autothermal reformer 7, in which the gas stream together with gas rich in oxygen, in particular oxygen from an air separation plant or the like, is autothermally reformed to a synthesis gas in the presence of a cracking catalyst. The synthesis gas emerging from the autothermal reformer 7 with a temperature of 900 to 1050° C., in particular about 975° C., subsequently is supplied to a waste heat boiler 8 and used e.g. for obtaining methanol or ammonia.

The amount of the gas stream guided past the steam reformer 4 via the bypass conduit 5 depends on the desired $H_2/CO$ ratio after the autothermal reformer. For methanol plants, the $H_2/CO$ ratio is about 2:1. For this purpose, an amount of 20 to 30%, in particular about 25%, of the entire natural gas feed stream branched off via the bypass conduit 5 was found to be expedient. In other applications, however, up to 80% can be branched off.

The alternative procedure shown in FIG. 2 differs from the first embodiment merely in terms of the arrangement of the pre-reformer. In contrast to the pre-reformer 2, which in the first embodiment is provided in the main stream before the branching point 3, two separate pre-reformers $2_1$ and $2_2$ are provided in the conduit portion 9 leading to the steam reformer 4 or in the bypass conduit 5 in accordance with the second embodiment. The remaining mode of function and operation of this plant corresponds to that of the first embodiment, so that reference can be made to the above explanations. Accordingly, identical components of the plant are provided with the same reference numerals. The arrangement of a second pre-reformer $2_2$ in the bypass conduit 5 is particularly useful when retrofitting existing plants, which already have a pre-reformer $2_1$ in the conduit portion 9 before the steam reformer. Due to retrofitting in accordance with the invention, natural gas with a high content of higher hydrocarbons can also be processed in these plants.

This invention provides for processing heavy natural gas with a high content of e.g. >12 vol-% of hydrocarbons with more than two carbon atoms. Since the higher hydrocarbons are eliminated in the entire gas stream by means of the pre-reformer, the inlet temperature of the autothermal reformer can be maximized. This provides for reducing the supply of oxygen in the autothermal reformer, which on the one hand leads to cost savings and also reduces the $CO_2$ content in the synthesis gas. The latter is advantageous in particular in methanol plants, which require a $CO_2$ content as small as possible in the synthesis gas.

The system of the invention can be used very flexibly for different gas qualities, as independent of which natural gas is processed, the composition of the gas stream after the pre-reformer largely is the same. Especially for plants operated with different kinds of natural gas, the process of the invention appears to be expedient.

EXAMPLE

In the following Table, the process data and balance flow rates in a plant of the invention in accordance with the first embodiment are indicated by way of example, wherein the measurement points are designated with M1-M7 in FIG. 1 (M2 actually lies after the steam supply and subsequent heating before entry into the pre-reformer).

| Measurement point | | M1 | M2 | M3 | M4 | M5 | M6 | M7 |
|---|---|---|---|---|---|---|---|---|
| Temperature | °C. | 30 | 480 | 750 | 650 | 702 | 1000 | 40 |
| Pressure | bar | 61.0 | 43.8 | 36.3 | 37.1 | 36.3 | 35.1 | 31.2 |
| Mole flow | kmol/h | 6000 | 13322 | 12500 | 7305 | 19806 | 32153 | 22703 |
| Mass flow | kg/h | 114772 | 246688 | 176923 | 125194 | 302118 | 434890 | 264607 |
| Mole content | | | | | | | | |
| CO | mole-% | 0.0% | 0.0% | 5.0% | 0.1% | 3.2% | 16.0% | 22.6% |
| $CO_2$ | mole-% | 0.0% | 0.0% | 6.5% | 3.6% | 5.4% | 6.0% | 8.5% |
| $H_2O$ | mole-% | 0.0% | 55.0% | 35.2% | 44.2% | 38.5% | 29.6% | 0.3% |
| $H_2$ | mole-% | 0.0% | 0.0% | 35.6% | 5.7% | 24.6% | 47.7% | 67.5% |
| $CH_4$ | mole-% | 88.0% | 39.6% | 17.8% | 46.4% | 28.4% | 0.8% | 1.1% |
| $C_2H_6$ | mole-% | 5.0% | 2.3% | 0.0% | 0.0% | 0.0% | 0.0% | 0.0% |
| $C_3H_8$ | mole-% | 4.0% | 1.8% | 0.0% | 0.0% | 0.0% | 0.0% | 0.0% |
| $C_4H_{10}$ | mole-% | 3.0% | 1.4% | 0.0% | 0.0% | 0.0% | 0.0% | 0.0% |

It turns out that the amount of higher hydrocarbons in the feed gas (merely the $C_2$-$C_4$ components are indicated), which originally is >12 vol-%, was reduced to near zero after the pre-reformer (M3 ff). In the illustrated example, a 50:50 division of the partial streams is performed by the steam reformer 4 and via the bypass conduit 5, respectively. This requires a relatively high feed of vapor before the steam reformer 4. The inlet temperature of the autothermal reformer 7 (M5) is >700° C. At the outlet of the plant (M7) a $H_2$/CO ratio of about 3:1 is obtained.

LIST OF REFERENCE NUMERALS

1 desulfurization plant
2 pre-reformer
3 branching point
4 steam reformer
5 bypass conduit
6 heat exchanger
7 autothermal reformer
8 waste heat boiler
9 conduit portion

The invention claimed is:

1. A process for producing synthesis gas from a starting material containing hydrocarbons,
   dividing a feed stream of the starting material into a first partial stream and a second partial stream,
   supplying the first partial stream to a steam reformer, in which together with steam it is catalytically converted to a gas stream containing hydrogen and carbon oxides,
   heating the second partial stream to a temperature between 600° C. and 700° C.,
   combining the first partial stream upon steam reforming again with the second partial stream, and
   supplying the combined gas stream to an autothermal reformer, in which it is autothermally reformed to a synthesis gas together with gas rich in oxygen,
   wherein before steam reforming and before autothermal reforming the entire feed stream of the starting material is supplied to a pre-reformer, in which the starting material largely is liberated from higher hydrocarbons.

2. The process according to claim 1, wherein before division into the first and second partial streams, the starting material is subjected to the pre-reforming.

3. The process according to claim 1, wherein after division into the first and second partial streams, the starting material are separately subjected to the pre-reforming.

4. The process according to claim 1, wherein the starting material is subjected to a steam reforming reaction in the pre-reformer.

5. The process according to claim 1, wherein the starting material is supplied to the pre-reformer with a temperature of 400 to 500° C.

6. The process according to claim 1, wherein that in the second partial stream 20 to 80%, of the starting material are branched off and guided past the steam reformer.

7. The process according to claim 1, wherein the gas stream is supplied to the autothermal reformer with a temperature of 650 to 850° C.

8. The process according to claim 1, wherein the starting material has a content of hydrocarbons with two or more hydrocarbon atoms of more than 10 vol-%.

* * * * *